May 11, 1965  J. E. DIEHL  3,183,428
MEANS FOR IMPROVING COMMUTATION AND DECREASING RADIO
INTERFERENCE VOLTAGES OF D. C. COMMUTATING MACHINES
Filed Feb. 13, 1962  2 Sheets-Sheet 1

INVENTOR.
JOHN E. DIEHL
BY
Brown, Critchlow, Flick & Peckham
ATTORNEYS

BEST AVAILABLE COPY

May 11, 1965   J. E. DIEHL   3,183,428
MEANS FOR IMPROVING COMMUTATION AND DECREASING RADIO
INTERFERENCE VOLTAGES OF D. C. COMMUTATING MACHINES
Filed Feb. 13, 1962   2 Sheets-Sheet 2

INVENTOR.
JOHN E. DIEHL
BY
*Brown, Critchlow, Flick & Peckham*
ATTORNEYS

United States Patent Office 3,183,428
Patented May 11, 1965

3,183,428
MEANS FOR IMPROVING COMMUTATION AND DECREASING RADIO INTERFERENCE VOLTAGES OF D.C. COMMUTATING MACHINES
John E. Diehl, St. Marys, Pa., assignor to Stackpole Carbon Company, St. Marys, Pa., a corporation of Pennsylvania
Filed Feb. 13, 1962, Ser. No. 172,958
6 Claims. (Cl. 318—439)

My invention relates broadly to D.C. commutating machines and more particularly to means for decreasing the radio interference voltages and maintenance, improving the performance and efficiency, and prolonging the life of commutator and brushes in such machines.

One of the objects of my invention is to provide means in the field circuits of D.C. commutating machines, having two or more poles, for symmetrically arranging the magnetic flux fields relative to each other about the armature to minimize current unbalances within the armature.

Another object of my invention is to provide means in the field circuits of D.C. commutating machines for decreasing the electrical variations which take place around the commutator periphery and beneath the brushes during commutation.

Another object is to provide in D.C. commutating machines for the reduction of radio interference voltages.

Another object of my invention is to provide means for D.C. commutating machines of the type having more than two poles, for decreasing the brush arm current variation with rotational frequency to a minimum.

Still another object of my invention is to provide means for D.C. commutating machines for prolonging commutator and commutator brush life.

A further object of my invention is to provide means for improved commutation and extending present limits of commutation for D.C. commutating machines.

Figure 1:
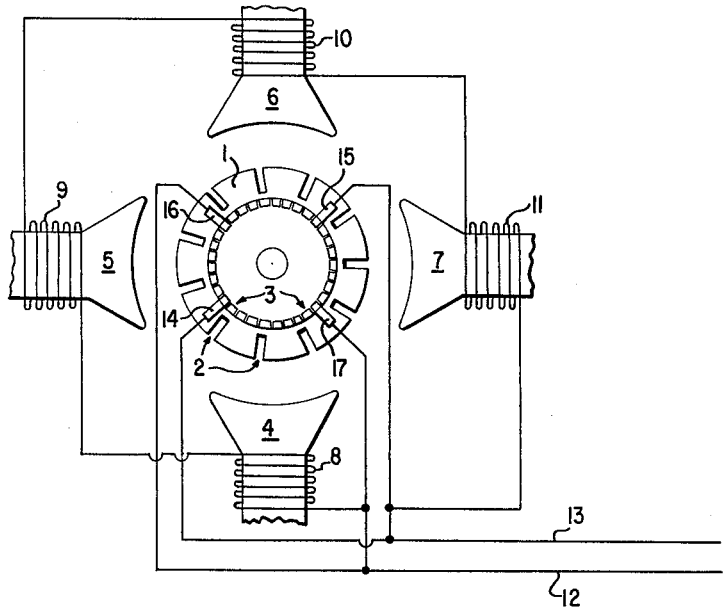
Figure 3:
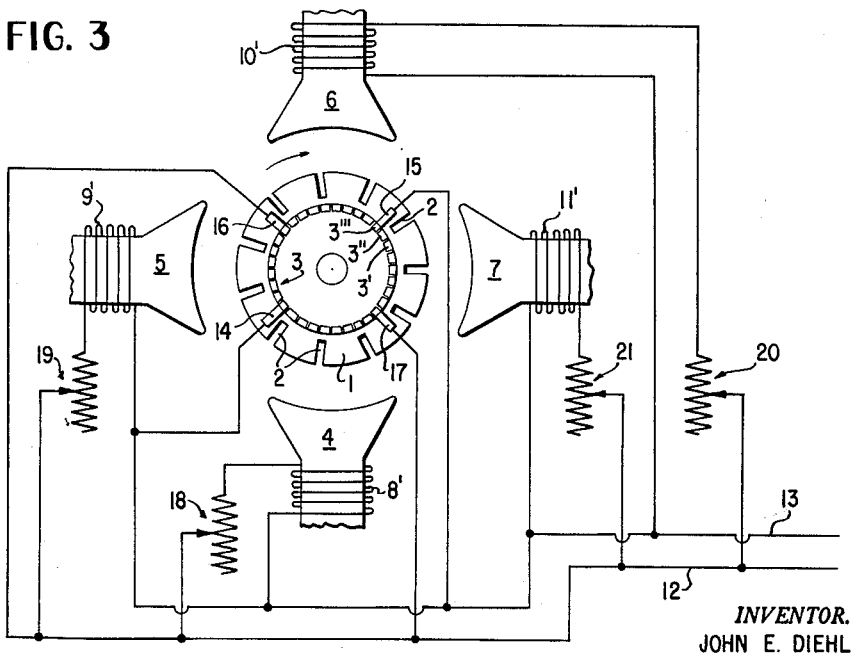
Figure 2:
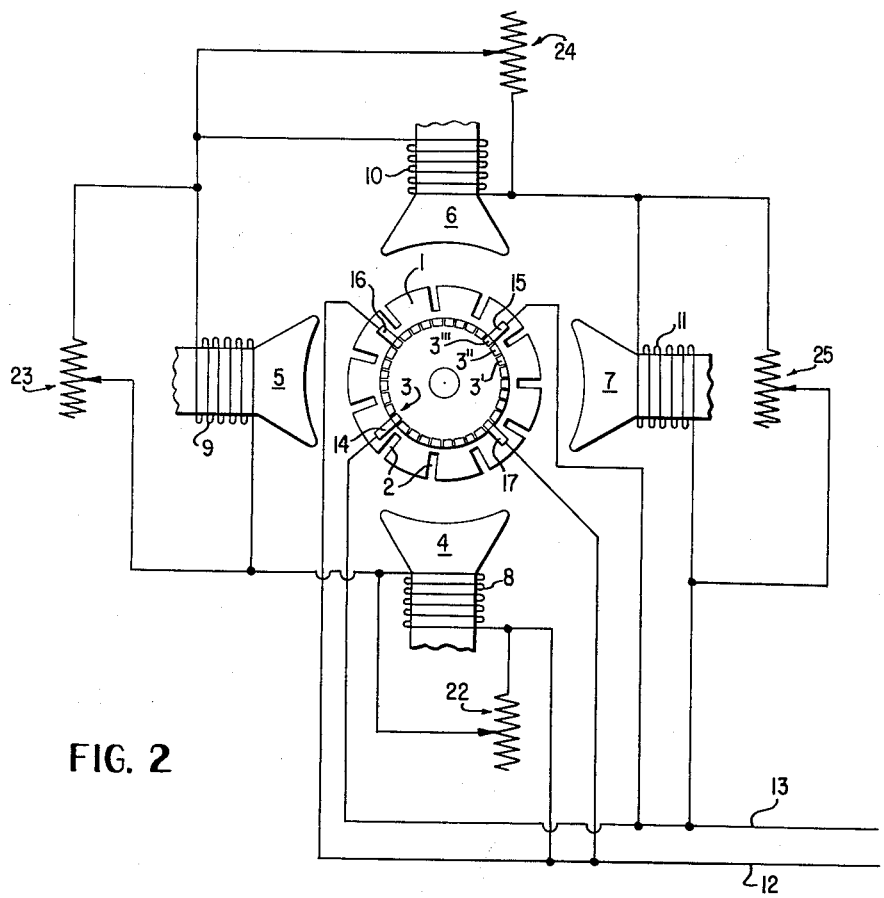

Other and further objects of my invention reside in the manner in which the high frequency pulses produced during commutation are dissipated in the means provided in the field circuits to reduce electrical noise, and in the manner in which the pitting of the commutator and brush surfaces, current unbalances, variations and fluctuations within the armature, around the commutator and through brushes are decreased as set forth more fully in the specification hereinafter following by reference to the accompanying drawings, in which:

FIG. 1 is an electrical schematic diagram of a four pole conventional D.C. commutating machine showing the shunt field windings connected in series in conventional manner;

FIG. 2 is an electrical schematic diagram of a four pole D.C. commutating machine showing the field windings connected in series with adjustable resistor elements connected in parallel with each of the series connected field coils in accordance with the teachings of my invention; and FIG. 3 is an electrical schematic diagram of a four pole D.C. commutating machine showing the application of the adjustable resistance elements of my invention to a machine having its shunt field windings connected in parallel.

In D.C. commutating machines, if the electrical requirements of a commutator brush on a plurality of commutator bars could be made more nearly like those of a brush on a collector ring by decreasing the electrical transients which occur between the brush face and the surface of the commutator bar, greatly improved commutation and substantially longer commutator brush life could be obtained. The present invention makes it possible to build and adjust a D.C. commutating machine having two or more poles to approach this condition and thus greatly prolong brush life, commutator life, and also improve commutation by decreasing the magnetic variations which occur across the armature during rotation and by decreasing the electrical differences which normally take place within the armature, around the commutator and beneath the brushes. In existing machines in which at least two brush arms are connected in parallel, oscillograms have shown wide variations in the current loading of the parallel arms. This is partly due to the mechanical, electrical and magnetic dissymmetries of the rotating armature, partly to the unsymmetrical arrangement of the magnetic flux of the individual field poles which contributes directly and also amplifies the effect of the said armature unbalances, and partly to the commutating characteristics of D.C. commutating machines wherein every commutator bar is not disposed in exact radial alignment with its associated armature coil, nor the coil positioned in proper relation with respect to the effective magnetic flux pattern, such that commutation can be adjusted for only a relatively few commutator bars, those which are in proper relative alignment, through their respective armature coils, with their associated flux paths. The variations in the current loading of the parallel arms is increased by the commutating characteristics factor mentioned above in machines which carry more than a single armature coil per armature slot since the commutator bars connected with these coils are not all in radial alignment with the armature slot in which the coils are disposed, so that as the number of armature coils per slot is increased the number of commutator bars which are out of proper relative alignment with their associated flux paths is increased. The commutator bars leading the bars which are in relative alignment with their flux paths will be commutated at a time different from the commutator bars which lag the relatively aligned bars while the coils associated with each of the commutator bars lie within the same armature slot which is disposed in positions relative to the flux field which are different from the relative positions of the leading and lagging commutator bars in the flux field at their time of commutation to thus cause differences in commutating current as the various bars are commutated.

This will become more apparent by reference to the accompanying drawings wherein the armature of a D.C. commutating machine is indicated by reference numeral 1, carrying armature coil slots indicated generally at 2. For purposes of simplicity in illustration, coils have not been shown in the armature slots 2, but it is to be understood that the armature coils are wound within these slots. The armature illustrated in the drawings, merely for purposes of illustration, is designed to have three armature coils disposed in each slot 2, each coil having a commutator bar, these commutator bars being illustrated generally at 3. Of course the invention is also applicable to such an armature having only a single coil in each slot. Although an eleven slot armature has been shown for purposes of illustration, the invention is applicable to an armature having any number of slots, such as 33, etc., with three coils per slot, to give a ninety-nine bar commutator or five coils per slot to give a one hundred sixty-five bar commutator, etc. For purposes of clarity it is best to describe a machine having only a few commutator bars; therefore, an armature having three coils in each slot 2 has been illustrated with three commutator bars, 3', 3" and 3''', respectively connected with each of the three armature coils in each slot. The center commutator bar 3" is disposed in radial alignment with the armature slot 2 while commutator bar 3' is disposed in a position leading the slot 2, and commutator bar 3''' is disposed in a position lagging slot 2, depending upon the direction of armature rotation.

A machine having four field poles has been illustrated in the drawings with the field poles indicated at 4, 5, 6 and 7. In FIG. 1, the field windings 8, 9, 10 and 11, respectively wound on the field poles 4, 5, 6 and 7 of the four pole D.C. machine, are shown connected in electrical series with each other across the lines 12 and 13, which represent the lines supplying the input or output voltage depending upon the type of D.C. commutating machine. The commutator brushes 14 and 15, connected to line 13, and commutator brushes 16 and 17, connected to line 12, electrically connect the armature coils in parallel with the field windings in a conventional manner. In the majority of machines of this type the pairs of brush arms such as 14-15 and 16-17 are each electrically connected by a jumper wire extending between the individual brushes of the pairs with only a single line connecting each pair of brushes to its respective line 13 and 12. In some large machines, connections as shown in FIG. 1 are employed for the brushes, but in addition jumper leads are also used to directly connect the brush arms of each pair to insure proper electrical connections.

Since the commutation current of each bar is at a somewhat different value, and in some cases of opposite polarity, transients or high frequency pulses are produced during commutation. This problem is not as apparent in a machine having one armature coil per slot, since the commutator bar connected with the coil can be disposed in radial alignment with the coil; but the problem of high frequency commutation pulses becomes more acute as the number of coils per armature slot is increased, since in existing machines the energy, which must be dissipated when each bar is commutated, is fairly high. The difference in the commutation current of each commutator bar causes high frequency pulses and causes arcing between the surface of the commutator and the commutator brushes, which results in pitting of the commutator bars and eating-away or burning of the commutator brush surfaces, resulting in decreased brush life and roughened commutator surface which results in further decrease of the useful life of the brushes. In addition, the high frequency pulses produce undesirable radio interference voltages.

If, however, selectively adjustable resistance members 22, 23, 24 and 25 of FIG. 2 are connected in parallel with field windings 8, 9 10 and 11, respectively, the external impedance to any field coil will be low and the energy dissipation will be high so that the high frequency electrical impulses induced by the aforesaid commutation variations can be more easily dissipated.

In addition to these bar frequency induced pulses, there are unbalances and fluctuations or variations in the strength of any and all portions of the magnetic flux field which are caused by the armature dissymmetries and, by themselves, produce unbalanced and variable current distribution within the armature windings, around the commutator periphery and through brush arms at a rate proportional to the slot and rotational frequencies. These variations and unbalances are, in themselves, relatively minor but their effects are amplified by the normally encountered dissymmetries in the magnetic flux pattern since the magnetic field produced by the different field poles are not equal and thus do not react alike to the relatively consistent armature produced variations, all of which greatly aggravates the previously mentioned armature caused unbalances and tends to produce current reversals in various armature coils that may not coincide with the commutation of the bars associated with those coils. All of these variables combine and accumulate to reduce machine, commutator, and brush performance, detract from machine efficiency and commutating characteristics, increase the radio interference voltage generated, and add to machine maintenance through commutator wear and the relatively short brush life realized.

In the assembly of a D.C. commutating machine after armature 1 has been placed in its bearings in a fixed relation to the field poles 4, 5, 6 and 7, the aforesaid magnetic and electrical unbalances and variations exist by virtue of the economically dictated tolerances in the magnetic and electrical characteristics of the materials employed and practical manufacturing procedures. According to the present invention, after the machine has been assembled the physical shape of the magnetic fields produced by the coils 8-11 wound on poles 4-7, respectively, can be adjusted by means of the variable rheostats 22-25, previously introduced as a means of lowering external field coil impedance to better dissipate the high frequency bar pulses, to effect a more uniformly distributed magnetic flux pattern, minimize the aforesaid amplifying effect and leave only the relatively minor magnetic and electrical variations and unbalances caused by the said armature dissymmetries. The adjustable rheostats are a means to compensate to a large degree for the magnetic and electrical unbalances built into machines which are caused by such things as variations in pole piece placement, field coil turns, bearing locations, field frame casting and the like.

Once the main pole field strengths are balanced, the usual practice of interpole field adjustment becomes more efficient and effective, as each portion of the magnetic field will tend to react to such normal adjustment procedure to the same degree and in the same manner as the other portions, and result in adjustment for proper commutation applying to all or a greater number of armature coils than is the case with the normally unbalanced main field pattern.

This means of manipulating the shape of the overall magnetic field through adjustment of the individual field coil strengths can also be used, to a considerable degree, to compensate for magnetic nonuniformities introduced by normal wear of bearings and the associated air gap changes. However, if such gradual compensation of normal wear introduced variations are not to be considered, the rheostats need only be used to determine the proper individual resistance values for initial magnetic balance, and, if desired, may be replaced with more permanent, or semifixed, less expensive and more compact shunting resistance wires.

In FIG. 3 I have shown the adaptation of my invention to a D.C. commutating machine wherein the shunt field windings 8', 9', 10' and 11', respectively wound on field poles 4, 5, 6 and 7, are connected electrically in parallel. Here the adjustable rheostats 18, 19, 20 and 21 are connected respectively in series with field coils 8'-11'. This arrangement increases only slightly the external impedance of the individual field coils and decreases their ability to dissipate the bar frequency transients a minor degree. Since Erle I. Shobert, in his copending application for D.C. Machine With Reduced High Frequency Commutation Pulses, has shown that changing the connection of such shunt field coils from series to parallel enables them to reduce the amplitude of the high frequency pulses to one-tenth, the slight decrease caused by the aforesaid insertion of the rheostats is negligible. Yet such means facilitate a more symmetrical arrangement of the magnetic flux fields around the armature of a machine so connected with the same advantages to machine, commutator, brushes, and maintenance thereof, as mentioned for the machine of FIG. 2 whose field coils are connected in series.

Those familiar with the art are hereby also taught how the teachings of this invention are advantageously adaptable to compound and series wound machines and that the benefits derived are not limited to series and parallel connected shunt field machines.

While I have described my invention in certain preferred embodiments, I realize that modifications may be made and I desire that it be understood that no limitations upon my invention are intended, other than may be imposed by the scope of the appended claims.

I claim:

1. A D.C. commutating machine of the type having two or more poles comprising, armature means, commutator means carried by said armature means, means for commutating said commutator means upon rotation of said armature, a plurality of field pole means arranged about and spaced from said armature means, field windings disposed on said field pole means and electrically connected with each other, and individual resistance means connected to conduct current under all operating conditions of the machine each connected in electrical circuit with a respective field winding for separately balancing the strengths and changing the shapes of the magnetic fields of said field pole means, dissipating undesirable commutation energy, and compensating for magnetic and electrical unbalances built into the machine.

2. D.C. commutating machines comprising, rotatable armature means, coils carried by said armature means, commutator means carried by said rotatable armature means, and connected with said coils carried thereby, means connected for commutating said commutator means upon rotation of said armature means, at least a pair of field pole means arranged about and spaced from said rotatable armature means, field windings disposed on each of said field pole means and electrically connected with each other and said means connected for commutating said commutator means, and individual circuits having resistance only with each circuit electrically connected with a respective field winding for separately balancing the shape of the magnetic field pattern of said field pole means for proper commutation of a greater number of the coils carried by said armature means.

3. D.C. commutating machines as set forth in claim 2, in which an individual resistance means is connected in series with each of said field windings, and the field winding and individual resistance means of each field pole means are connected in electrical parallel.

4. A D.C. commutating machine comprising, rotatable armature means, commutator means carried by said armature means, brush means connected for commutating said commutator means upon rotation of said armature, a plurality of field poles arranged about and spaced from said armature means, field windings disposed on each of said field poles and electrically connected with each other and said brush means, and variable resistance means electrically connected individually to each of said field windings and adapted to conduct current under all operating conditions of the machine for separately varying the strengths and patterns of the magnetic fields of said field poles for decreasing the electrical and magnetic unbalances built into the machine to improve commutation.

5. A D.C. commutating machine as set forth in claim 4, in which said field windings are connected in electrical series with each other and said variable resistance means are individually connected in parallel with said field windings.

6. A D.C. commutating machine of the type having two or more poles comprising rotatable armature means, commutator means carried by said armature means, brush means disposed to commutate said commutator means upon rotation of said armature means, at least two field pole means arranged about and spaced from said armature means, field windings disposed on said field pole means and electrically connected with each other and with said brush means, and separate circuits containing resistance only connected to conduct current whenever said field windings are energized each connected with a respective field winding for dissipating undesirable commutation pulses and radio interference voltages and for separately balancing the strengths and changing the shapes of the magnetic fields of said field pole means about said armature to compensate for magnetic and electrical unbalances inherent in the machine.

References Cited by the Examiner

UNITED STATES PATENTS 2,800,598   7/57   Whitcraft _____ 310—220

JOHN F. COUCH, *Primary Examiner.*

ORIS L. RADER, *Examiner.*